UNITED STATES PATENT OFFICE.

WILLIAM DENISON FOLGER, OF CALCUTTA, INDIA.

MIXED PAINT.

SPECIFICATION forming part of Letters Patent No. 307,451, dated November 4, 1884.

Application filed March 17, 1884. (No specimens.) Patented in India November 29, 1883, No. 170.

*To all whom it may concern:*

Be it known that I, WILLIAM DENISON FOLGER, a citizen of the Empire of India, residing at 28 European Asylum Lane, in the town of Calcutta, in the East Indies, gentleman, and formerly a master mariner, have invented certain new and useful improvements in the preparation, manufacture, and application of an anti-fouling and anti-corrosive composition for iron and other ships and steamers, to prevent the accumulation of barnacles and sea-weed on iron ships and injury by teredo or ship-worm to the bottom of wooden ships and steamers and all things submerged in sea-water; and I do hereby declare the following to be a full, clear, and exact description of the invention, such as will enable others skilled in the art to which it appertains to make and use the same.

My invention relates to a composition of matter designed for the protection of metals from oxidation by exposure to atmospheric or other influences liable to act injuriously upon the same, and also for the protection of other substances liable to be injuriously affected by atmospheric influences; and it consists in a compound of crystalline iodine, spirits of turpentine, carbon, carbolic acid, and red oxide of iron, reduced to a proper consistency by the addition of boiled linseed-oil; and when a rapid drying is desirable any one of the well-known driers may be added.

In carrying out my invention I take of crystallized (leaf) iodine one part, and mix the same with one part of spirits of turpentine. To this I add twenty parts of carbon, either vegetable charcoal or bituminous coal, in a finely-pulverized condition. When these ingredients are thoroughly incorporated, I add two parts of carbolic acid and again mix the same, and then seventy-six parts of red oxide of lead, (red ocher.)

The above-named ingredients constitute the essential elements, and when so compounded may be placed upon the market and sold as a protective agent for metals and other substances.

When the compound is to be used, it is reduced to the proper consistency by the admixture of a sufficient quantity of boiled linseed-oil, so as to adapt the compound for surface application by means of a brush, like any other paint.

The proportion of linseed-oil may vary for the purpose of manufacture. Eighteen parts of linseed-oil to one hundred parts of the compound may be used, and more linseed-oil is or may be added when the paint is to be used. This compound will usually dry in about twenty-four hours, or more or less, according to the surrounding temperature; but when a more rapid drying is desired a sufficient quantity of any of the well-known driers may be employed—such, for instance, as shellac, a varnish, or any one of the well-known patent driers. The proportion of the drier will necessarily vary according to the rapidity at which it is desired the paint should dry, and must be left to the discretion of the user. The carbolic acid and turpentine, as well as the carbon, not only act upon the substances as powerful antiseptics, but also as insecticides. The compound is therefore adapted in a high degree to the protection of substances immersed in water or exposed to moisture—as, for instance, the bottoms of vessels of all classes—against destruction from decomposition or the agglomeration of barnacles. The carbolic acid and turpentine, being intimately incorporated with the other ingredients, will also retain their chemical and other properties for a long time. The paint may also be prepared ready for use and filled in cans of given capacity in the same manner as ordinary paints are now prepared for use.

I do not wish to limit myself to the exact proportions of ingredients as above set forth, as these may be varied. The proportions of either the spirits of turpentine or the carbolic acid may be increased or reduced, reducing or increasing the proportions of the other ingredients correspondingly as it may be found desirable, or as special use of the protective agent may demand.

Having now described my invention, what I claim, and desire to secure by Letters Patent of the United States, is—

The herein-described composition of matter, consisting of crystallized iodine, spirits of turpentine, carbon, carbolic acid, linseed-oil, and red oxide of iron.

In testimony whereof I affix my signature in the presence of two witnesses.

WILLIAM DENISON FOLGER.

Witnesses:
JOHN REMFRY,
IOGESH CHUNDER BOSE.